United States Patent [19]
Miller

[11] 3,856,251
[45] Dec. 24, 1974

[54] SELF-COMPENSATING EXTENSIBLE BEAM

[75] Inventor: Julius Miller, Brockton, Mass.

[73] Assignee: Nouveau Products Corporation, Brockton, Mass.

[22] Filed: Oct. 24, 1972

[21] Appl. No.: 299,710

[52] U.S. Cl............................. 248/280, 240/81 BE
[51] Int. Cl........................... A47f 5/00, F21s 1/02
[58] Field of Search........... 248/280, 281, 278, 292, 248/297, 123; 240/78 F, 81 BE

[56] References Cited
UNITED STATES PATENTS

| | | | |
|---|---|---|---|
| 808,983 | 1/1906 | Hallowell | 248/280 |
| 2,076,446 | 4/1937 | Carwardine | 248/280 |
| 2,547,532 | 4/1951 | Mendelsohn | 248/292 |
| 2,700,524 | 1/1955 | Lauterbach | 248/280 |
| 3,426,190 | 2/1969 | Bobrick | 248/280 X |
| 3,533,654 | 10/1970 | Kannegieter | 248/292 X |
| 3,547,390 | 12/1970 | Mehr | 248/280 |
| 3,713,453 | 1/1973 | Chiaro | 248/280 X |
| R17,845 | 10/1930 | Bosworth | 248/292 |

FOREIGN PATENTS OR APPLICATIONS

| | | | |
|---|---|---|---|
| 137,284 | 8/1948 | Australia | 248/280 |

*Primary Examiner*—J. Franklin Foss
*Attorney, Agent, or Firm*—Morse, Altman, Oates & Bello

[57] ABSTRACT

A pivoted articulated and extensible beam is provided for manually mounting an appliance such as a TV set or the like to a wall or other vertical support. A base unit is mounted to a wall bracket for pivotal movement about a vertical axis. A primary arm is mounted to the base unit for movement about a horizontal axis and engages a pair of springs one of which normally urges the primary arm into a raised retracted position. A levered secondary arm is pivoted near the free end of the primary arm and carries at its own free end a gimballed hanger for the TV set. The inner end of the secondary arm is spring-loaded by means of self-compensating unit including a connecting rod engaging a shipping rod through a coil spring. The shipping rod pivotally engages the base unit at a point spaced rearwardly from the pivot point of the primary arm whereby, if the arm is tilted forwardly, it will change the pressure on the coil spring so as to compensate the vector change resulting from the alteration of the beam. The system maintains a self-compensating pressure-balanced beam regardless of the position of either arm. Internal wiring permits a TV set or the like to be electrically connected without the use of exterior cords.

8 Claims, 5 Drawing Figures

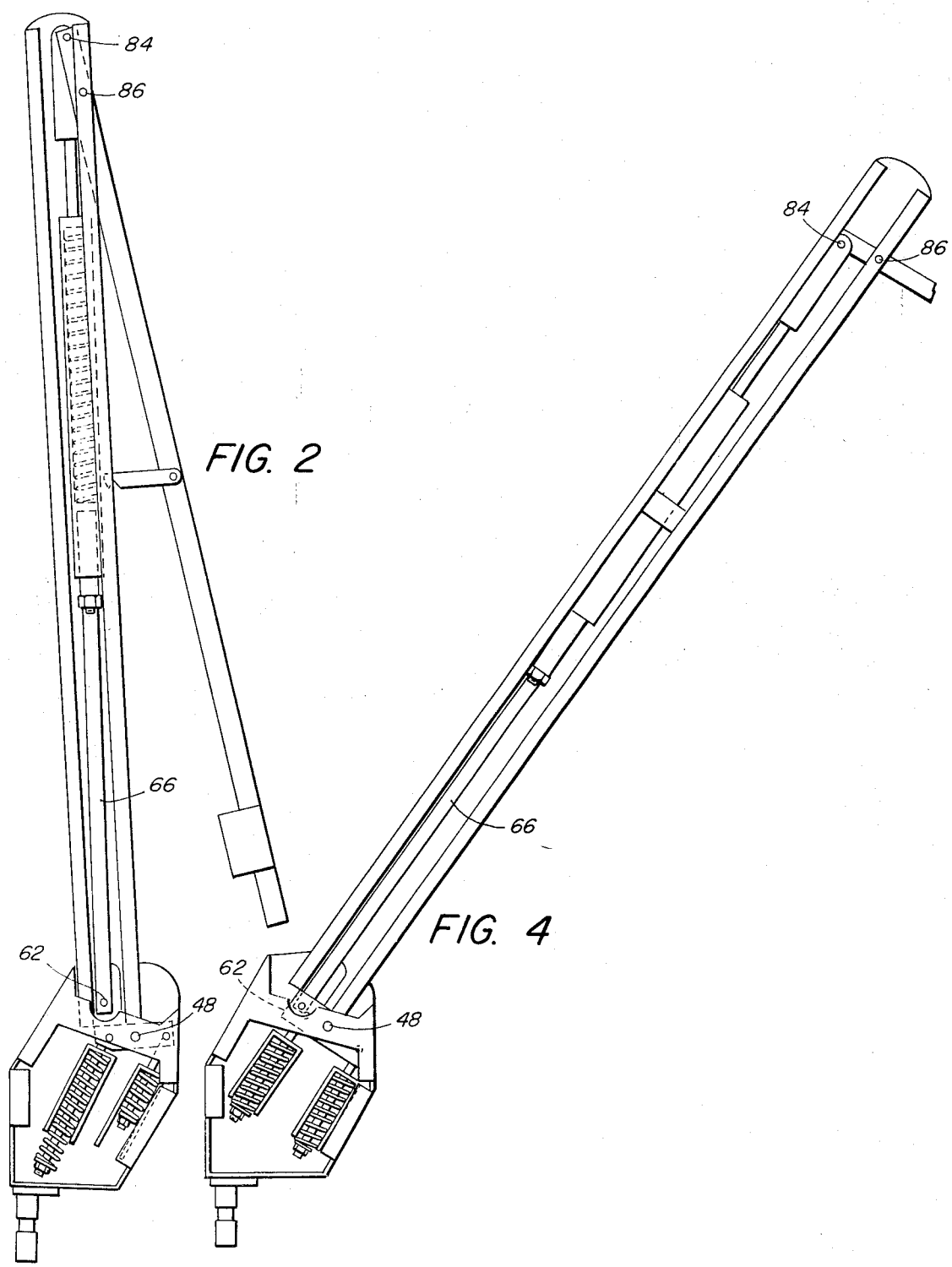

3,856,251

SELF-COMPENSATING EXTENSIBLE BEAM

BACKGROUND OF THE INVENTION

1. Field of the Invention

This invention relates generally to extension arms for movably mounting various objects at selected elevated positions. More particularly, this invention is directed towards a new and improved extension beam arm pivotally mounted for supporting a relatively heavy object and having only two exposed moving arm members.

2. Description of the Prior Art

Extension arms of various types have been developed heretofore for a wide range of uses such as dentist drills, study lamps and the like. Most arms of this type have employed a parallel rod arrangement using some type of friction joint. The units have not been suitable for supporting heavy objects and do not adequately compensate for effective load changes on the arm due to changes in extension or position.

Accordingly, it is an object of the present invention to provide a new and improved extension arm particularly suited for supporting a heavy object such as a TV set or the like. Another object of this invention is to provide a self-compensating, counter-balanced extension beam arm adapted to hold an object stable in any selected position yet easily movable to a different position within reach of the arm.

SUMMARY OF THE INVENTION

This invention features a self-compensating, extensible beam support for a load such as a TV set or the like, comprising a mounting plate formed with a vertical socket, a base unit having a male member pivotally mounted in said socket, a primary arm pivotally mounted to the base unit about a horizontal axis, a secondary arm pivotally mounted to the outer end of the primary arm and a gimballed, load-supporting hanger suspended from the free end of the secondary arm. A spring-biased beam in the base unit engages the primary arm, normally urging it into a raised, retracted position countering the load suspended from the end of the secondary arm. A spring-loaded connection is provided between the inner end of the secondary arm and the base unit at a point eccentric to the pivot of the primary arm whereby a variable compensating force is introduced to the secondary arm in response to a change in angular position of either the primary or secondary arm. An internal wiring system is provided for energizing an electrical appliance such as a TV set carried by the beam.

BRIEF DESCRIPTION OF THE DRAWINGS

FIG. 2 is a view in side elevation showing the device in a retracted and locked position with the cover plates removed and partly in section to show details of construction, FIG. 4 is a view similar to FIG. 2 showing both the primary and secondary arms extended, and, FIG. 5 is a sectional view in front elevation of the primary arm and base unit.

DETAILED DESCRIPTION OF THE PREFERRED EMBODIMENT

Figure 1:
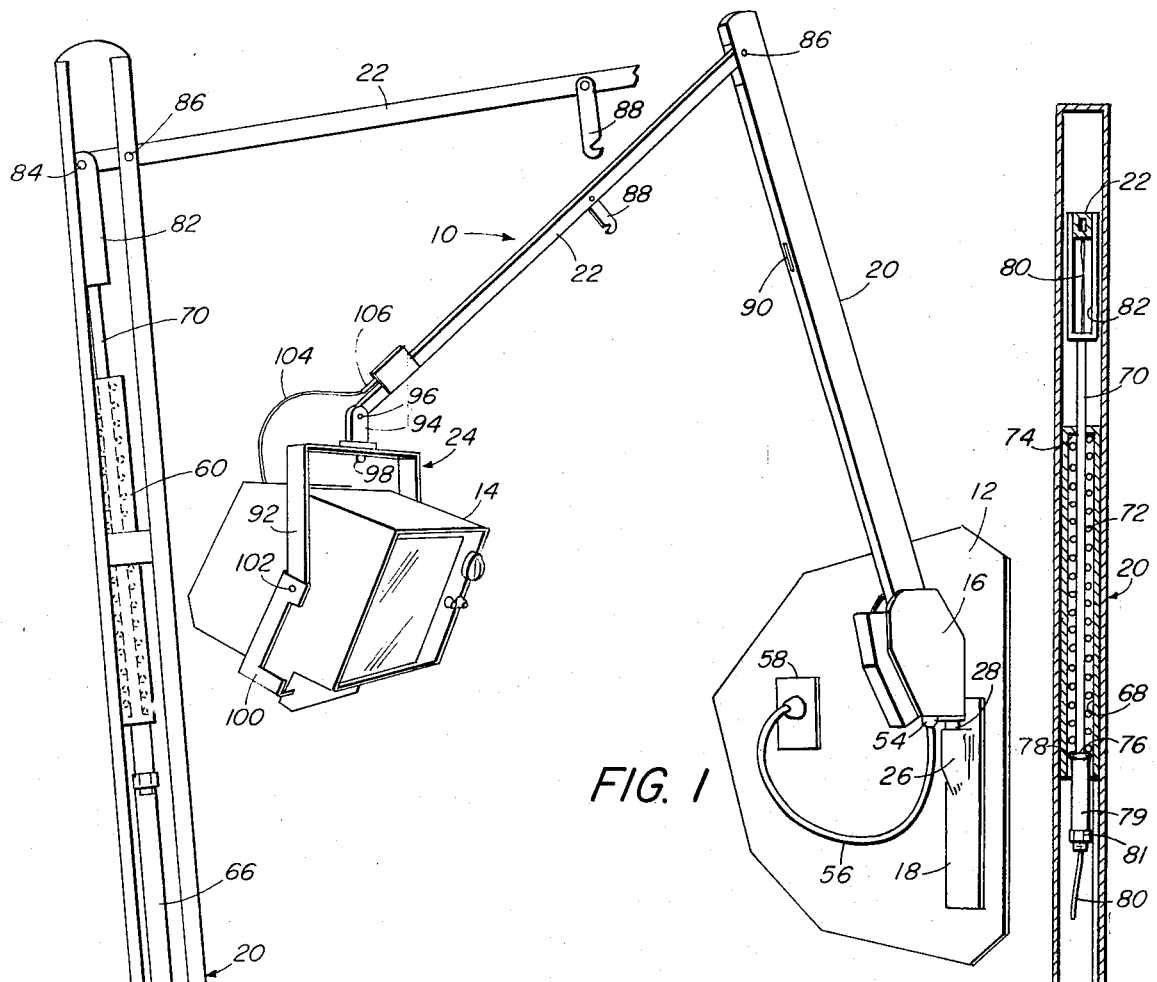
FIG. 1 is a view in perspective of an extensible beam support made according to the invention and in use with a TV receiver.

Referring now to the drawings, the reference character 10 generally indicates an extensible beam mounted to a wall 12 or other vertical support and adapted to carry a television set 14 or other load in a manner permitting free and easy stable positioning of the set 14 to any vertical or horizontal point within the reach of the beam. The beam assembly is generally organized about a base unit 16 pivotally mounted about a vertical axis to a wall bracket 18 with a primary arm 20 pivotally mounted about a horizontal axis to the base 16, a secondary arm 22 pivotally mounted about a horizontal axis to the outer end of the primary arm and a gimballed frame 24 suspended from the free end of the secondary arm 22.

The wall bracket 18, as illustrated, is in the form of a simple, flat plate screwed or otherwise fastened to the wall 12 and formed with a boss 26 having a vertical socket formed therein adapted to receive a male pivot shaft 28 depending vertically from the base 16. This connection permits the base unit 16 to swing freely about a vertical axis to the extent permitted by the wall 12.

The base unit 16 is in the form of a boxed enclosure housing a pair of coil springs 30 and 32 mounted in parallel guideways 34 and 36 and engaging a pair of connecting rods 38 and 40 by means of washers 42 and 44 attached to the lower ends of the rods. The opposite ends of the rods 38 and 40 extend through the upper ends of the guideways and pivotally engage opposite ends of a rocker 46 rigidly mounted perpendicularly across the lower end of the primary arm 20 and pivoted about a horizontal axis to the base 16 by means of a pivot pin 48. It will be noted that the axis of the pivot 48 lies in a plane near the right-hand side of the primary arm as viewed in FIG. 3 for reasons that will presently appear. The base unit 16 is formed with an upper slot opening 50 through which the primary arm 20 extends, the opening being sufficiently wide to permit the arm to pivot through an arc of perhaps 45° or so. In order to prevent a person from accidentally catching his fingers between the primary arm and the base, a curved spring shield 52 is mounted to the lower end of the primary arm across the opening to block access to the base 16.

The primary arm 20 is normally under pressure from the spring 30 which is compressed in its guideway 34. The force of the spring 30 is sufficient to hold the primary arm in a raised position until it is manually biased about its axis 48. The function of the spring 32 is to provide a slight counter-force to the spring 30 to dampen the motion of the arm 20 as it is biased back to a vertical position. If the primary arm 20 is tilted forwardly, the spring 32 provides no biasing action.

The base unit 16 also includes an electrical connecting post 54 to provide both electrical power and an antenna connection internally through the base unit, and the primary and secondary arms to the television set. The post 54 is adapted to receive the socket end of a cord 56 connected to the opposite end to a power pack unit 58 connectable both to an AC outlet and to an antenna outlet.

The primary arm 20 is in the form of a hollow elongated housing of rigid material such as sheet metal and encloses a parallel, self-compensating spring-loaded connecting assembly generally indicated by the reference character 60. The assembly 60 is pivotally connected at its lower end by means of a pin 62 to a side wall of the base unit 16.

Figure 3:
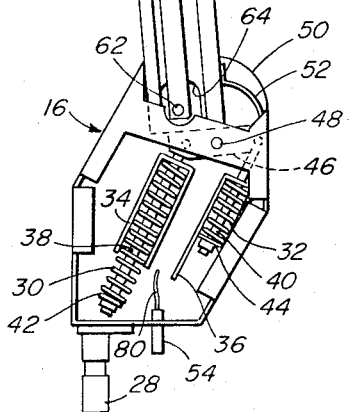
FIG. 3 is a view similar to FIG. 2 showing the secondary arm fully extended.
Figure 5:
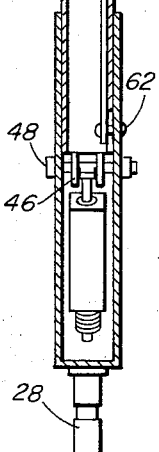

It will be noted in FIG. 3 that the pivot pin 62 is offset from the pivot pin 48 on which the primary arm pivots and it will be understood that, when the primary arm 20 is biased forwardly, the pivot pin 62 remains in place since it is mounted to the side wall of the base unit 16 and not to the primary arm. The lower end of the primary arm is cut away at 64 to provide clearance for the pivot pin 62. The pivot pin 62 engages a shipping rod 66 which forms part of the assembly 60 and, as best shown in FIG. 5, the shipping rod 66 is an extension of one wall of a tube 68 telescopically receiving a connecting rod 70 and a coil spring 72 trapped therein. The tube 68 is opened at its lower end and the upper end is formed with an annular shoulder 74 engaging the upper end of the spring 72. The lower end of the spring engages a washer 76 seated on an annular shoulder 78 formed by the upper end of a sleeve 79 carried on the lower portion of the connecting rod 70 and held by a nut 81. In practice, the connecting rod 70 is hollow to accommodate an electrical lead 80 connected to the post 54 and to the television set. The spring 72 normally is somewhat compressed so as to provide a biasing action to the inner end of the secondary arm 22. The upper end of the connecting rod 70 is bifurcated at 82 and pivotally engages the inner end of the secondary arm 22 by means of a cross-pin 84. The secondary arm 22 is pivotally mounted to the primary arm by means of the pivot pin 86 which is offset from the pivot pin 84 so that the pin 86 serves as a fulcrum.

It will thus be understood that, if the secondary arm 22 is biased about the pivot pin 86, the connecting rod 70 will be moved upwardly or downwardly with respect to the tube 68 and this will increase or decrease the compression of the spring 72 depending on which direction the secondary arm is biased. If the secondary arm is biased downwardly, the pressure on the spring 72 will increase whereas it will decrease if the secondary arm is biased upwardly. The compression of the spring 72 is also controlled by the angular position of the primary arm 20. If the primary arm 20 is biased to the right, as suggested in FIG. 4, this will have the effect of compressing the spring 72 insofar as the lower end of arm 20 will be moved longitudinally with respect to the lower end of the shipping rod 66 which is restrained at its lower end by the pivot pin 62. The result is that the shipping rod will pull downwardly against the spring 72. This increase in compression of the spring 72 automatically counter-balances the compounding weight of the television set which occurs upon extension of the beam. The compensating unit 60 thus accommodates for effective vector changes in the load at the end of the secondary arm without changing resistance in the operation of the unit. This compensation occurs whether either or both of the primary and secondary arms are manipulated.

The secondary arm also is of tubular construction and of a rigid material such as steel or the like and carries the lead 80 therein. The secondary arm can be locked against the primary arm in a stored, retracted position by means of a latching arrangement comprising a hook 88 adapted to engage the inner face of the primary arm 20 through a slot 90.

The cradle hanger 24 suspended from the free end of the secondary arm 22 provides a gimbal mounting for the television set 14 to permit it to be rotated about a vertical axis as well as to be tilted about a horizontal axis. The cradle includes an upper yoke portion 92 connected to the end of the secondary arm 22 by means of a turnbuckle 94 pivotally connected to the end of the secondary arm 22 by means of a pivot pin 96. The turnbuckle 94 connects to the yoke 92 by means of a pivot pin 98 which allows the yoke to rotate about a vertical axis. The cradle includes a lower yoke portion 100 on which the TV set 14 is mounted by screws or the like and the lower yoke pivotally and frictionally connects to the upper yoke by means of horizontal pivot pins 102. The TV set is mounted in a balanced position so that it may be tilted about a horizontal axis and remain in any desired tilted position most convenient to the viewer. A lead 104 connects the television set to a jack 106 mounted on the arm 22, which jack is electrically connected to the internal lead 80.

The extension beam provides substantial mobility for a TV set or other appliance that may be supported on the end of the extensible beam without change in resistance. The operator may swing the TV set or the like easily into any position with very little effort since the unit is balanced by the automatic compensating system as described above. The set may be raised or lowered, moved in or out or tilted to any position within the reach of the beam and the set will remain stable in the position once it is selected. When not in use, the beam may be retracted so that the secondary arm will lock against the primary arm. While the retractable beam has been described for use particularly with a TV set it may be used to advantage with a variety of other appliances such as X-ray equipment, hair-dryers, power tools or the like. The leads and the compensating spring arrangement are fully enclosed to provide a clean, simple structure.

Having thus described the invention what I claim and desire to obtain by Letters Patent of the United States is:

1. A self-compensating, extensible beam, comprising a. a base,
b. a fully rigid single tubular primary arm pivotally mounted at one end to said base about a first horizontal axis,
c. first spring means engaging said primary arm at said one end and urging it into a normally raised position,
d. said first spring means including a rigid rocker arm fixed perpendicularly to the one end of said primary arm and intersecting said first axis, a pair of parallel guideways mounted fixed to said base and oriented along lines extended to opposite sides of said first axis, a coil spring mounted in each of said guideways, a connecting rod connected to each end of said rocker arm, each of said connecting rods extending through said guideways in co-axial engagement with one of said coil springs,
e. a fully rigid single secondary arm levered near one end directly to the other end of said primary arm about a second horizontal axis parallel to said first axis,
f. load-supporting means mounted to the free other end of said secondary arm, and, g. second spring means extending longitudinally within said primary arm and connected to said one end of said secondary arm and to said base at a point spaced from said first axis of said primary arm for normally urging upwardly said other end of said secondary arm, said point being offset from a line between said first and second axes, whereby the force on said second spring means will increase upon at least one of said arms being pivoted downwardly, h. said second spring means including a coil spring, a connecting rod engaging the lower end of said spring and said one end of said secondary arm, and a shipping rod engaging the upper end of said spring and said base at said point whereby said spring is compressed between said rods.

2. A self-compensating, extensible beam according to claim 1 including means mounting said base for pivotal movement about a vertical axis.

3. A self-compensating, extensible beam according to claim 1 including a sleeve telescopically enclosing said coil spring, said connecting rod and said shipping rod.

4. A self-compensating, extensible beam according to claim 1 wherein said primary arm is hollow and said coil spring, said connecting rod and said shipping rod are disposed longitudinally therein.

5. A self-compensating, extensible beam according to claim 1 including lock means mounted to one of said arms and engageable with the other of said arms for locking both arms in a retracted position.

6. A self-compensating, extensible beam according to claim 1 wherein said load supporting means includes a frame mounted to the free end of said secondary arm for pivotal movement about a vertical axis.

7. A self-compensating, extensible beam according to claim 6 wherein said frame includes a hinged portion mounted for movement about a horizontal axis.

8. A self-compensating, extensible beam according to claim 1 including an electrically conductive lead threaded internally through said primary and secondary arms.

* * * * *